(12) United States Patent
Chihwan et al.

(10) Patent No.: US 12,535,331 B2
(45) Date of Patent: Jan. 27, 2026

(54) APPARATUS AND METHOD FOR DISPLAYING INDOOR DRIVING INFORMATION BASED ON CLASSIFICATION OF USAGE SCENARIOS

(71) Applicants: HYUNDAI MOTOR COMPANY, Seoul (KR); KIA CORPORATION, Seoul (KR); Hyundai Autoever Corp, Seoul (KR)

(72) Inventors: Kim Chihwan, Hwaseong-si (KR); Sung Taehyun, Hwaseong-si (KR); Junho Kim, Seoul (KR)

(73) Assignees: Hyundai Motor Company, Seoul (KR); Kia Corporation, Seoul (KR); Hyundai Autoever Corp, Seoul (KR)

( * ) Notice: Subject to any disclaimer, the term of this patent is extended or adjusted under 35 U.S.C. 154(b) by 93 days.

(21) Appl. No.: 18/531,316

(22) Filed: Dec. 6, 2023

(65) Prior Publication Data
US 2024/0328806 A1    Oct. 3, 2024

(30) Foreign Application Priority Data

Mar. 27, 2023    (KR) .................... 10-2023-0039566

(51) Int. Cl.
G01C 21/36    (2006.01)
(52) U.S. Cl.
CPC .................. G01C 21/3626 (2013.01)
(58) Field of Classification Search
None
See application file for complete search history.

(56) References Cited

U.S. PATENT DOCUMENTS

2014/0309924 A1* 10/2014 Varoglu ............... G01C 21/206
701/457
2024/0175713 A1* 5/2024 Zuo ....................... G01C 21/206

FOREIGN PATENT DOCUMENTS

CN    114459462 A  *  5/2022  .......... G01C 21/206
KR    10-1178042 B1     8/2012

* cited by examiner

*Primary Examiner* — Adam D Tissot
(74) *Attorney, Agent, or Firm* — Morgan Lewis & Bockius LLP

(57) ABSTRACT

In an apparatus and method for displaying indoor driving information based on the classification of usage scenarios, a driving information display apparatus includes: a processor configured to receive driving guidance information and information related to the location of a vehicle, and to perform control to output a guidance screen corresponding to the driving guidance information; and a storage unit electrically and communicatively connected to the processor and configured to store road information and an algorithm executed by the processor. The processor is further configured to: determine whether the vehicle has entered an indoor section; in response that the vehicle has entered the indoor section, determine whether the vehicle is in an entry state or in an exit state; and perform control to output different guidance screens in response that the vehicle is in the entry state and in response that the vehicle is in the exit state, respectively.

13 Claims, 6 Drawing Sheets

FIG. 1

Driving Information Display Apparatus (101)

FIG. 2

| Category | Name | Classification information |
|---|---|---|
| Directional information | Aquarium | Entry |
| Directional information | Exit to Bongeunsa-ro | Entry |
| Ramp | 3rd basement floor (from 2nd basement floor to 3rd basement floor) | Entry |
| Ramp | Exit (from 2nd basement floor to outside) | Entry |

APPARATUS AND METHOD FOR DISPLAYING INDOOR DRIVING INFORMATION BASED ON CLASSIFICATION OF USAGE SCENARIOS

CROSS-REFERENCE TO RELATED APPLICATION

The present application claims priority to Korean Patent Application No. 10-2023-0039566 filed on Mar. 27, 2023, the entire contents of which is incorporated herein for all purposes by this reference.

BACKGROUND OF THE PRESENT DISCLOSURE

Field of the Present Disclosure

The present disclosure relates to an apparatus and method for displaying indoor driving information based on the classification of usage scenarios, and more particularly to an apparatus that can optimize and set guidance information to be displayed based on the classification of usage scenarios when displaying driving information in an indoor section such as an underground parking lot, and a method of operating the apparatus.

Description of Related Art

With the development of location information and geographic information processing technology using the Global Positioning System (GPS) and/or the like, various types of driving information are provided while a vehicle is driving. Recently, as it has become possible to measure the location of a vehicle even in an indoor section in various ways, driving guidance has become available even in indoor sections such as underground parking lots.

Meanwhile, when driving information is provided in an indoor section as described above, various types of information are presented in a space narrower than an outdoor road, making it rather difficult for a driver to obtain necessary information within a short time period. Therefore, there is a demand for technology capable of selecting and outputting only necessary information according to the usage scenario of a vehicle by checking the current driving state of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing guidance information helpful for the driving of a vehicle in an indoor section.

An object of the present disclosure is to prevent unnecessary information from being excessively provided by classifying and outputting display information according to the usage scenario of a vehicle.

An object of the present disclosure is to accurately determine whether a vehicle is in a state of entering an indoor section or in a state of exiting the indoor section to output only necessary information according to the usage scenario of a vehicle.

The objects to be achieved as an exemplary embodiment of the present disclosure are not limited to the objects described above, and other objects may be clearly understood by those skilled in the art from the following detailed description of the present disclosure.

According to various aspects of the present disclosure, there is provided a driving information display apparatus including: a processor configured to receive driving guidance information and information related to the location of a vehicle, and to perform control to output a guidance screen corresponding to the driving guidance information; and a storage unit electrically and communicatively connected to the processor and configured to store road information and an algorithm executed by the processor; wherein the processor is further configured to: determine whether the vehicle has entered an indoor section based on the information related to the location of the vehicle and the road information; in response that the vehicle has entered the indoor section, determine whether the vehicle is in an entry state or in an exit state based on the information related to the location of the vehicle and the road information; and perform control to output different guidance screens in response that the vehicle is in the entry state and in response that the vehicle is in the exit state, respectively.

The processor may be further configured to: set the state of the vehicle to an entry state in response that the vehicle enters the indoor section from an outdoor section; in response that new destination information is received, check whether a new destination is within the indoor section that the vehicle has entered; and in response that the new destination is outside the indoor section that the vehicle has entered, change the state of the vehicle to an exit state.

The processor may be further configured to check whether the new destination is within the indoor section by comparing information related to the location of the new destination with information related to the location and range of the indoor section that the vehicle has entered.

The processor may be further configured to: receive information related to the starting state of the vehicle; and in response that the starting state of the vehicle is changed to an OFF state after an entry to the indoor section and then changed to an ON state again, change the state of the vehicle to an exit state.

The processor may be further configured to change the state of the vehicle to an exit state only in response that the difference between the time when the starting state of the vehicle is changed to the OFF state and the time when the starting state of the vehicle is changed to the ON state again is equal to or greater than a predetermined reference value.

The storage unit may be further configured to further store classification information in which display information to be provided in the indoor section and selected from display information included in the road information is classified into entry guidance information, exit guidance information, and common guidance information; and the processor may be further configured to perform control to output display information corresponding to the entry guidance information and the common guidance information out of the display information in response that the vehicle is in an entry state and to output display information corresponding to the exit guidance information and the common guidance information out of the display information in response that the vehicle is in an exit state.

The storage unit may be further configured to store the classification information obtained by classifying the display information, to be provided in the indoor section, into the entry guidance information, exit guidance information, and common guidance information through the analysis of the names of the display information.

The storage unit may be further configured to store the classification information generated by classifying the display information as entry guidance information in response that the name of the display information includes the name of a facility inside the indoor section and classifying the display information as exit guidance information in response that the name of the display information includes the name of a road outside the indoor section.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the following description of the present disclosure, when it is determined that a detailed description of a related known configuration or function may obscure the gist of the present disclosure, the detailed description will be omitted. Furthermore, in the description of the exemplary embodiments of the present disclosure, specific numerical values are merely examples, and the scope of the present disclosure is not limited thereto.

In the description of the components of the exemplary embodiments of the present disclosure, terms such as first, second, A, B, (a), (b), etc. may be used. These terms are each used only to distinguish one component from other components, and the nature, sequence, or sequential position of the corresponding component is not limited by the term. Furthermore, unless defined otherwise, all the terms (including technical or scientific terms) used herein include the same meanings as commonly understood by those of ordinary skill in the art to which an exemplary embodiment of the present disclosure pertains. Terms such as those defined in commonly used dictionaries should be interpreted as including meanings consistent with the meanings in the context of the related art. Unless explicitly defined in the present application, these terms should not be interpreted as including ideal or excessively formal meanings.

The exemplary embodiments of the present disclosure will be described in detail below with reference to FIGS. 1 to 7.

Figure 1:
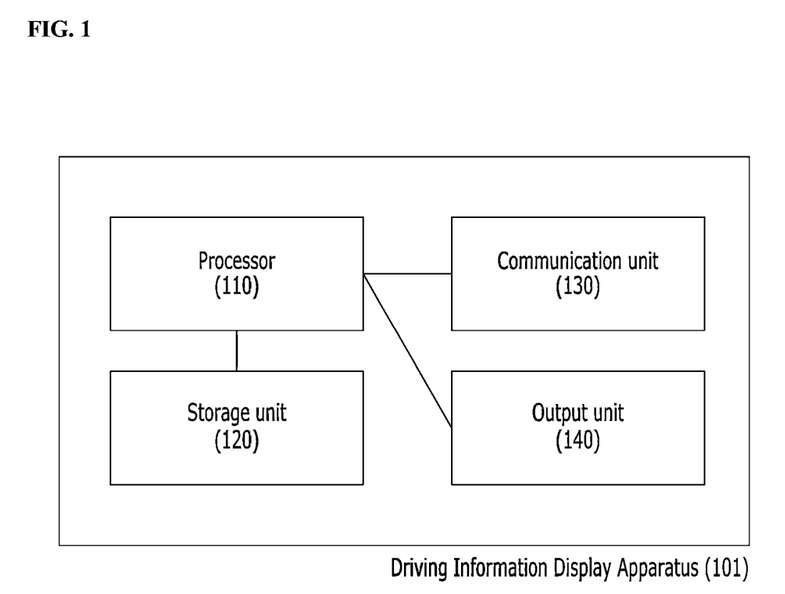
FIG. 1 is a block diagram showing the internal configuration of a driving information display apparatus according to various exemplary embodiments of the present disclosure.

FIG. 1 is a block diagram showing the internal configuration of a driving information display apparatus 101 according to various exemplary embodiments of the present disclosure.

The driving information display apparatus 101 according to the exemplary embodiment may be provided inside a means of transportation such as a vehicle, or may be implemented in a detachable form. The driving information display apparatus 101 may generally take the form of a vehicle navigation system, a vehicle Audio, Video and Navigation (AVN) system, a head-up display (HUD), or the like. The driving information display apparatus 101 may also be implemented in the form in which an application is provided on a mobile phone terminal such as a smartphone.

The driving information display apparatus 101 according to the exemplary embodiment may be present in a form of a server outside a means of transportation such as a vehicle. In the instant case, the driving information display apparatus may be implemented to, while being present outside the means of transportation, generate driving guidance information by processing determinations and output the guidance information to a display or the like inside the means of transportation. Furthermore, various embodiments may be implemented, but the scope of the present disclosure is not limited to the configurations of these embodiments.

Furthermore, the driving information display apparatus 101 according to the exemplary embodiment may be operated in conjunction with apparatuses for autonomous driving control such as an Advanced Driver Assistance System (ADAS), Smart Cruise Control (SCC), Forward Collision Warning (FCW), and/or the like.

As shown in the drawing, the driving information display apparatus 101 according to the exemplary embodiment may include a processor 110, a storage unit 120, a communication unit 130, and an output unit 140.

The processor 110 is configured to control the storage unit 120, the communication unit 130, and the output unit 140 to run an application, process data according to an algorithm defined in the application, and provide the results of the processing to a user while communicating with an external module.

The processor 110 may refer to a chip for processing a general algorithm such as a central processing unit (CPU) or an application processor (AP), or a set of such chips. The processor 110 may refer to a chip optimized for floating-point arithmetic, such as a general-purpose determining on graphics processing unit (GPGPU), to process an artificial intelligence algorithm such as deep learning, or a set of such chips. Alternatively, the processor 110 may refer to a module in which various types of chips are connected and distributed to perform an algorithm and process data.

The processor 110 may be electrically and communicatively connected to the storage unit 120 and the communication unit 130, may electrically control the individual components, may be an electric circuit that executes software commands, and may perform various types of data processing and determination to be described later. The processor 110 may be, for example, an electronic control unit (ECU), a micro-controller unit (MCU), or another lower level controller which is mounted on a means of transportation.

The storage unit 120 stores road information and an algorithm run by the processor. The road information may include map information, road traffic condition information, and/or the like. Depending on the configuration of the driving information display apparatus 101 of the present disclosure, the form or amount of road information stored inside the driving information display apparatus 101 may vary.

In some cases, the storage unit 120 may store road information including the map information and traffic condition information of all serviceable areas and provide services based on the road information. Alternatively, the storage unit 120 may temporarily store only road information related to a location where guidance is being made and provide services based on the temporarily stored road information.

This may be implemented as a different form depending on the form in which the driving information display apparatus 101 according to an exemplary embodiment of the present disclosure is implemented inside or outside a means of transportation, the communication method used, the storage space of the storage unit 120, and/or input/output speed. This is a part which may be chosen autonomously by those skilled in the art depending on the implementation situation. The scope of the present disclosure is not limited by such changes in implementations.

The road information stored in the storage unit 120 may include not only general road information but also information guiding a driver to an entry/exit, a parking location, and the like in each indoor section such as an underground parking lot.

Furthermore, the road information stored in the storage unit 120 may include various types of display information to be displayed in guidance information. The display information may include various types of information, such as an intersection, traffic lights, a crosswalk, a destination, and/or an important landmark, to be included in guidance information which is displayed in a driving situation. Furthermore, the display information included in the road information may include a parking location, entry and exit locations, a ramp for movement between floors, indoor facilities, road information outside an indoor section connected from an exit, and/or the like for guidance inside the indoor section. The display information may be configured in a form in which the name of display information to be displayed as guidance information and information related to the location at which the corresponding display information is to be displayed are combined with each other.

The storage unit 120 may have various forms, and may be at least one type of storage medium such as a flash memory-, hard disk-, micro-, card (e.g., secure digital (SD) card or extreme digital (XD)) card)-, random access memory (RAM)-, static RAM (SRAM)-, read-only memory (ROM)-, programmable ROM (PROM)-, electrically erasable PROM (EPROM)-, magnetic memory (MRAM)-, magnetic disk-, or optical disk-type storage medium, or the like. Depending on the amount, processing speed, storage time, and/or the like of data to be stored, a different type of storage medium or a combination of different types of storage media may be chosen.

The algorithm stored in the storage unit 120 may be implemented as a computer program in an executable form, and may be implemented to be stored in the storage unit 120 and then executed in a required situation. The algorithm stored in the storage unit 120 may be interpreted as being also implemented in an instruction form which is temporarily loaded into volatile memory and instructs the processor to perform specific operations.

The communication unit 130 receives information for driving guidance from the outside of the driving information display apparatus 101 of the present disclosure over a wired/wireless communication network, and transmits necessary information to an external module.

The communication unit 130 may receive the road information stored in the storage unit 120, an algorithm run by the processor 110, and the like from an external module, and may transmit information related to the current state of a means of transportation to the outside to obtain necessary information related to the transmitted information. For example, the communication unit 130 may continuously receive traffic information from a traffic information server to check real-time traffic information, and is configured to transmit the location and route information of a means of transportation, found through a module such as a Global Positioning System (GPS) receiver, to the outside to obtain the real-time traffic information of an area related to the location and route of the means of transportation.

The communication unit 130 is a hardware device which is implemented using various electronic circuits to transmit and receive signals over a wireless or wired connection. In an exemplary embodiment of the present disclosure, the communication unit 130 may perform communication within a means of transportation using infra-transportation means network communication technology, and may perform Vehicle-to-Infrastructure (V2I) communication with a server, infrastructure, another means of transportation, and/or the like outside a means of transportation using wireless Internet access or short-range communication technology. In the instant case, the communication within a means of transportation may be performed using Controller Area Network (CAN) communication, Local Interconnect Network (LIN) communication, FlexRay communication, and/or the like as the infra-transportation means network communication technology. Furthermore, such wireless communication technology may include wireless LAN (WLAN), Wireless Broadband (WiBro), Wi-Fi, Worldwide Interoperability for Microwave Access (WiMAX), etc. Moreover, the short-range communication technology may include Bluetooth, ZigBee, Ultra-wideband (UWB), Radio Frequency Identification (RFID), Infrared Data Association (IrDA), etc.

The output unit 140 may output augmented reality information which is controlled by executing the algorithm, stored in the storage unit 120, via the processor 110. Augmented reality is a technology for enabling related information to be provided by adding graphic information to an image or scene of the real world.

The output unit 140 may be implemented as a head-up display (HUD), a cluster, an audio, video and navigation (AVN) system, a human-machine interface (HMI), and/or the like. Furthermore, the output unit 140 may include at least one of a liquid crystal display (LCD), a thin film transistor liquid crystal display (TFT LCD), a light emitting diode (LED) display, an organic light emitting diode (OLED) display, an active matrix OLED (AMOLED) display, a flexible display, a bent display, and a three-dimensional (3D) display. Some of these displays may be implemented as a transparent display configured in a transparent or translucent form to be able to view the outside thereof. Furthermore, the output unit 140 may be provided as a touch screen including a touch panel, and may be used as an input device as well as an output device.

In an exemplary embodiment of the present disclosure, the vehicle may be described as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

The driving information display apparatus 101 according to the exemplary embodiment may be implemented in different embodiments according to the method by which the processor 110 processes guidance information. Accordingly, the functions of the processor 110 will be divided into and described based on embodiments according to the road environment below.

The processor 110 is configured to perform control to receive driving guidance information and vehicle location information and to output a guidance screen corresponding to the driving guidance information. The driving guidance information includes information related to a destination and a route to the destination when the user sets the destination and wants to receive guidance information for the present through a screen. The driving guidance information may additionally include various types of information for guidance on the driving of a vehicle.

The driving guidance information received by the processor 110 may be information, such as a destination, received from the user, or may be information, such as route information, generated using the information stored in the storage unit 120.

As described above, the location information of the vehicle received by the processor 110 may be location information identified through a Global Positioning System (GPS) module or the like, and may be represented in a form which may be matched on the map information stored in the storage unit 120. Furthermore, when the vehicle enters the indoor section, the location information of the vehicle may be identified using various indoor positioning technologies other than Global Positioning System (GPS) technology, and the present disclosure is not limited to a specific method of identifying location information. However, because the present disclosure is technology intended to provide optimized guidance information according to the usage scenario in an indoor section, there is required a technology for identifying the location information of a vehicle in an indoor section in any form.

The processor 110 is configured to perform control to check the driving guidance information and the location information of the vehicle as described above, to determine the location, at which the vehicle is currently located, on a route to a destination, to generate guidance information based on the location information, and to output the guidance information through the output unit 140.

For example, the processor 110 reads map information around the location of the vehicle from the storage unit 120 based on the location information of the vehicle and outputs the map information through the output unit 140. Furthermore, information such as the direction in which the vehicle needs to drive in the future may be displayed on a map being output based on the driving guidance information, and display information located on the map being output may be read from the storage unit and output to each location.

Recently, as there are an increasing number of cases where not only information such as an intersection, a crosswalk, traffic lights, a speed camera, and/or the like but also information such as a restaurant, a tourist attraction, and/or the like are output together through the driving information display apparatus 101 such as a vehicle navigation system, the amount of display information displayed on a guidance screen is increasing. On general roads, there may be provided an appropriate-level of information which may be utilized by a driver. In contrast, in places such as the underground parking lots of department stores and large malls, information, including entrances for vehicles, information related to a road connected to each exit, entrances for people, information related to facilities close to the entrances for people, parking locations, ramps for movement between floors, etc., output within a narrow section is densely populated, which may cause confusion to the user.

Accordingly, the processor 110 determines whether the vehicle has entered an indoor section based on the location information of the vehicle and the road information stored in the storage unit 120, and when the vehicle has entered the indoor section, determines whether the vehicle is in an entry state or in an exit state based on the location information of the vehicle and the road information.

The processor 110 may be configured to determine whether the vehicle has entered an indoor section by determining whether the vehicle has moved from the road, on which the vehicle is traveling, toward the entrance of the indoor section such as an underground parking lot and the location of the vehicle has moved into the indoor space. Furthermore, when the location of the vehicle is measured using a beacon in an indoor space, it may be determined whether the vehicle has entered the indoor space based on whether it is connected to the beacon provided in the indoor space.

Usage scenarios in the case where a vehicle has entered an indoor space are chiefly classified into two types: an entry state and an exit state. The entry state is a state in which the vehicle enters the indoor space from the outside thereof and drives to park in a desired area, and the exit state is a state in which the vehicle drives to exit the indoor space through an exit.

When the vehicle is in the entry state, the driver's greatest purpose is to park his or her vehicle at a parking location close to an entrance for people to enter a desired space from the inside of the indoor space. In contrast, when the vehicle is in the exit state, the greatest purpose may be to move to an entrance for vehicles leading to the road most suitable for going to a desired destination.

Accordingly, while controlling the output of guidance screens, the processor 110 is configured to perform control to output different guidance screens when the vehicle is in the entry state and when the vehicle is in the exit state, respectively. When the vehicle is in the entry state, it may be possible to output information for the provision of guidance on an entrance for people leading to a specific space in each direction from the corresponding indoor space, together with route guidance for a location of the parking lot (an empty location of the parking lot when information may be obtained) according to a destination set by a driver. These pieces of information are display information which is output in the entry state.

In contrast, when the vehicle is in the exit state, there is provided guidance on a route for movement to an exit for vehicles most suitable for going to a road for traveling after the vehicle has exited the indoor space. Furthermore, because most of indoor spaces such as underground parking lots each includes multiple floors, there may be output information such as the location of a ramp for movement from a floor where the vehicle is currently located to a floor where an exit for vehicles is located. Furthermore, there may be output information related to a road connected to an exit in each direction from the indoor space. These pieces of information are display information which is output in the exit state.

As described above, the processor 110 may be configured to determine whether the vehicle is in an entry state or in an exit state when the vehicle is in an indoor section, and may output different information depending on the results of the determination even when the vehicle is at the same location. Accordingly, it may be possible to prevent a large amount of unnecessary information from being output and thus causing poor readability and confusion to the driver, and to provide optimized information.

To classify usage scenarios of the vehicle and provide optimized information as described above, the storage unit 120 stores classification information in which the display information to be provided in an indoor section and selected from the display information included in the road information is classified into entry guidance information, exit guidance information, and common guidance information. As described above, to output different information depending on whether the vehicle is in an entry or in an exit state, it is necessary to identify a situation in which each piece of display information is output.

Figure 2:
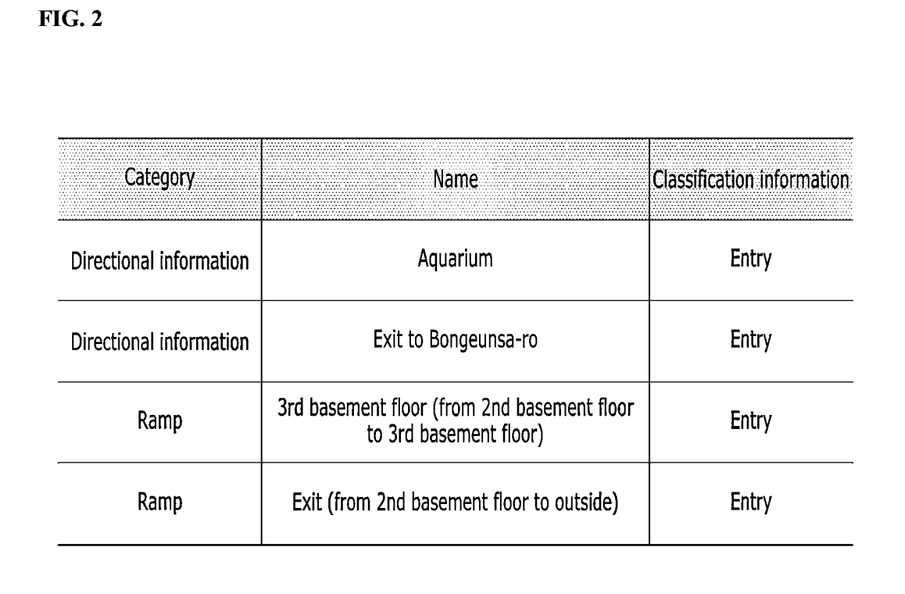
FIG. 2 is a diagram showing an example of display information included in road information stored in a driving information display apparatus according to various exemplary embodiments of the present disclosure.

FIG. 2 is a diagram showing an example of display information included in road information stored in a driving information display apparatus according to various exemplary embodiments of the present disclosure.

In general, the display information includes not only information related to the name and location (omitted in FIG. 2) of the corresponding display information but also information indicating the category to which the corresponding display information belongs (represented by the "category" in FIG. 2).

Through this, it is checked based on the location information of the display information whether there is display information within the range of map information output based on the location information of the vehicle, and the name of the display information is output at a corresponding location when there is display information within the range of map information. Furthermore, the display form of the display information or icon information to be displayed together with the display information may be determined using the information indicating the category to which the display information belongs.

The driving information display apparatus 101 according to the exemplary embodiment may be configured to additionally store classification information, as shown in FIG. 2, and to output different information depending on whether the vehicle is in an entry state or in an exit state when the vehicle is in an indoor space based on the stored classification information.

The example of FIG. 2 shows display information to be displayed inside the COEX underground parking lot in Samseong-dong. Information related to guidance on the direction of the "Aquarium" is intended to guide the driver to the space to which the driver wants to move in an indoor space, and is information which may be used in a situation in which a vehicle enters the indoor space and wants to park his or her vehicle because it is information adapted to guide the driver to park his or her vehicle near an entrance to the "Aquarium." Accordingly, "entry" is entered in a corresponding cell of the "classification information" column.

In contrast, information related to guidance on the direction of "Exit to Bongeunsa-ro" is information guiding a driver to an exit leading to Bongeunsa-ro out of various entrances and exits for vehicles, and is information to which a driver who wants to move to another area through Bongeunsa-ro can refer. Accordingly, the present display information is information that needs to be output to a vehicle in an exit state that wants to move from an indoor space to the outside thereof, and is stored as "exit" in the corresponding cell of the "classification information" column.

In the same manner, in the case of display information guiding the driver to a ramp toward a third basement floor (from a second basement floor to the third basement floor), information related to the ramp for movement from the second basement floor to the third basement floor is information which is necessary when the vehicle enters from the outside thereof and moves to check a parking space on a deeper floor because there is no parking space. Accordingly, the "classification information" for the present information is also stored as "entry." In contrast, even in the case of display information for the same third basement floor, when the vehicle wants to move from a fourth basement floor to the third basement floor, it may be possible to store the display information as a "common" guidance information because it is information which is necessary both when the vehicle is in an entry state and when it is in an exit state.

Finally, display information guiding the driver to an exit ramp (from the second basement floor to the outside) is information which is necessary when the vehicle is in an exit state in which it wants to move to the outside thereof, so that the "classification information" for the present display information is stored as "exit."

When various pieces of information to be displayed in an indoor space are classified into entry guidance information, exit guidance information, and common guidance information and stored in the storage unit 120, the processor 110 may identify the state of the vehicle and output necessary information.

The storage unit 120 analyzes the names of display information for the display information to be provided in an indoor section, and stores classification information, classified into entry guidance information, exit guidance information, and common guidance information, for the display information. The analysis of the names may be performed by the processor 110, or may be analyzed by and received from a separate system such as a server which is present outside the driving guidance apparatus. For rapid information update, the information analyzed and generated as described above may be received through the communication unit 130 and stored in the storage unit 120.

When existing display information is used without change, classification information is not included in the display information because an entry state and an exit state are not defined and identified in a conventional driving information display apparatus. Accordingly, of the existing display information, display information for each indoor section needs to be classified into an entry state, an exit state, and common use. Because a large number of pieces of display information are present, it takes a lot of time and effort to manually check them.

Therefore, in an exemplary embodiment of the present disclosure, each piece of display information is automatically classified as one of an entry state, an exit state, and common use by use of characteristic information revealed in the name of the display information, and the present classification information is stored in the storage unit 120. Accordingly, a usage scenario may be identified, so that optimized information may be provided.

The storage unit 120 stores classification information generated by classifying display information as entry guidance information when the name of the display information includes the name of a facility inside an indoor section and classifying the display information as exit guidance information when the name of the display information includes the name of a road outside the indoor section. As described above, the present classification operation may be performed by the processor 110, or may be performed by an external module. The storage unit 120 receives display information including classification information from the processor 110 or through the communication unit 130, and stores it.

As described above in conjunction with FIG. 2, display information including the name of a facility inside the indoor section, such as "Aquarium," is information necessary in an entry state. Furthermore, when the name of a road outside the indoor section is included as in "Exit to Bongeunsa-ro," the corresponding display information is information necessary for a vehicle in an exit state that wants to enter the corresponding road.

Furthermore, in the case of a ramp for movement between floors, display information for a ramp for movement in a direction away from an entrance for vehicles may be stored as information necessary for an entry state. When a specific keyword indicating a state, such as "exit," is included, an entry or exit state may be identified based on the keyword. After display information has been classified into entry guidance information and exit guidance information by the above-described method, display information that has not been classified into the above two cases may be set as common guidance information and output in both the cases.

Furthermore, tagged learning data may be learned using artificial intelligence (AI) technology, a model configured to output classification information by use of the names of display information included in newly input display information as input data may be generated based on the above learning, and newly input display information may be classified using the model.

The processor 110 outputs display information corresponding to entry guidance information and common guidance information when the vehicle is in an entry state, and outputs display information corresponding to exit guidance information and common guidance information when the vehicle is in an exit state.

As described above, since display information to be displayed in an indoor section is stored in the storage unit 120 in the state of being classified into entry guidance information, exit guidance information, and common guidance information, the processor 110 is configured to determine whether the vehicle is in an entry state or in an exit state, and is configured to perform control so that corresponding information is output according to each state through the output unit 140, providing optimized information according to the usage scenario.

Figure 3:
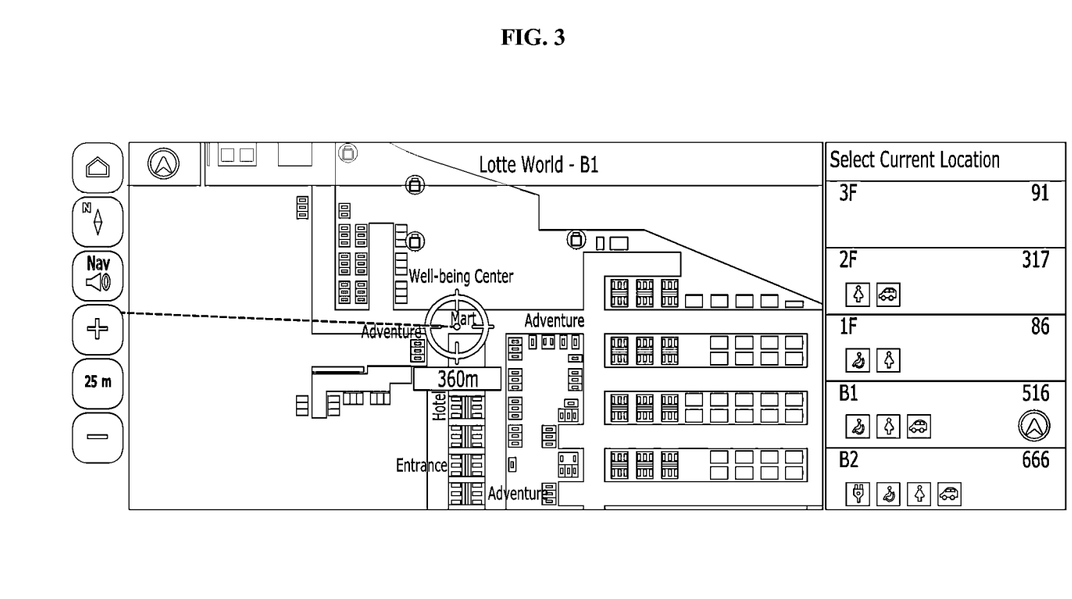
FIG. 3 is a diagram showing an example of a guidance screen output in response that a vehicle is in a state of entering an indoor section using a driving information display apparatus according to various exemplary embodiments of the present disclosure.
Figure 4:
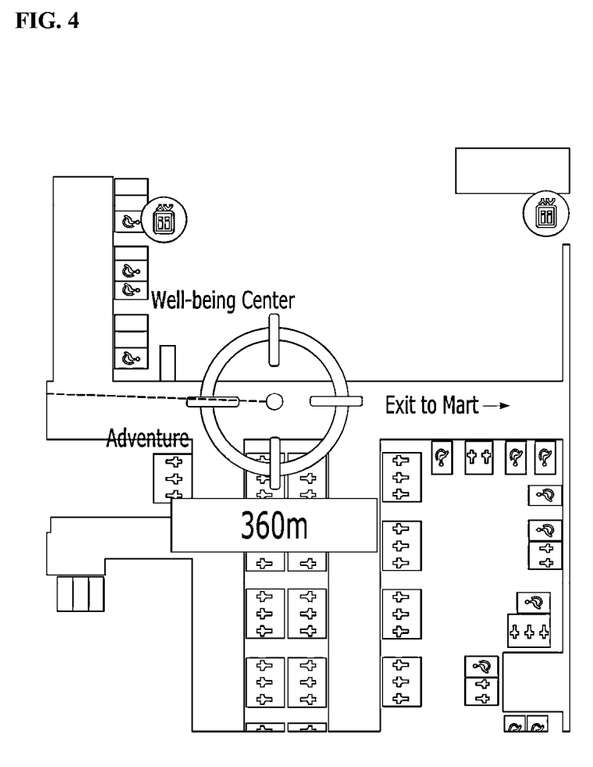
FIG. 4 is a diagram showing an example of a guidance screen output in response that a vehicle is in a state of exiting an indoor section using a driving information display apparatus according to various exemplary embodiments of the present disclosure.

FIG. 3 and FIG. 4 are views showing examples of guidance screens that are output when the vehicle enters an indoor section (see FIG. 3) and when the vehicle exits the indoor section (see FIG. 4), respectively, through a driving information display apparatus according to various exemplary embodiments of the present disclosure.

FIG. 3 and FIG. 4 show examples of cases where the vehicle is at the same location in an indoor space. FIG. 3 shows an example of a case where the vehicle is in an entry state at the same location, and FIG. 4 shows an example of a case where the vehicle is in an exit state at the same location.

In FIG. 3, the vehicle is in an entry state, so that information related to a facility or the like that the driver wants to check in the indoor space is output as entry guidance information. In the drawing, it may be seen that arrows are added to "Mart," "Adventure," and "Hotel" and information indicating the directions of the corresponding facilities is output. In the present manner, when the vehicle enters the indoor section, information guiding a driver through the inside of the indoor section is output because the driver wants to check the direction of a desired facility in the indoor section and park his or her vehicle in the corresponding direction thereof.

In contrast, in FIG. 4, the vehicle is in an exit state, so that information guiding a driver to an exit for vehicles to allow the driver to exit the indoor space is output as exit guidance information. In the drawing, an arrow is added to the "Mart Exit" to indicate the direction of the exit toward the mart. The present information is unnecessary when a vehicle enters and searches for a parking space, and is information which may be beneficially used when a vehicle wants to move to the outside thereof.

Furthermore, display information indicating the locations of areas of interest such as "Well-being Center" and "Adventure" displayed in both FIG. 3 and FIG. 4 may be classified as common guidance information, and may be displayed and utilized for both entry and exit states.

As described above, when the driving information display apparatus 101 according to an exemplary embodiment of the present disclosure is used, the usage scenario of a vehicle may be classified and optimized information may be provided accordingly, improving readability and enabling the information to be effectively utilized.

As described above, it is significantly important to distinguish between an entry state and an exit state because optimized information may be provided only when the processor 110 accurately distinguishes whether the vehicle is in an entry state or in an exit state. Conventionally, the state in which the vehicle enters the indoor space and the state in which the vehicle exits the indoor space are not distinguished from each other, so that an additional technical spirit is required to distinguish between them.

To the present end, the processor 110 sets the vehicle to an entry state when the vehicle enters an indoor section from an outdoor section. While the vehicle is moving in the outdoor section, it is not necessary to distinguish between the entry state and the exit state. When the vehicle enters the indoor section from the outdoor section, an entry state is set because the vehicle has once entered the indoor section. In the instant case, whether the vehicle has entered the indoor section from the outdoor section may be determined using the location information of the vehicle and the location and range information of the indoor section. Alternatively, whether the vehicle has entered the indoor section may be determined by checking whether the vehicle has passed the location of a vehicle entrance for entry to the indoor section through the checking of the location information of the vehicle.

After the vehicle has entered the indoor section from the outdoor section, the processor 110 maintains the entry state unless there is an additional state change. Various types of information may be analyzed to check whether the state of the vehicle has been changed to an exit state.

In the simplest method, the processor 110 may receive an input of whether the vehicle is currently in an entry state or in an exit state from the driver. When the vehicle enters the indoor section, a button configured for changing entry and exit states to each other may be formed on a screen output through the output unit 140, and the entry and exit states are changed to each other so that the driver presses the button. Although the present method is the most accurate method because the driver directly sets the state to check accurate information suitable for the situation, it is inconvenient in that the driver needs to make his or her own selection for each situation.

A second method will be described with reference to FIG. 5.

Figure 5:
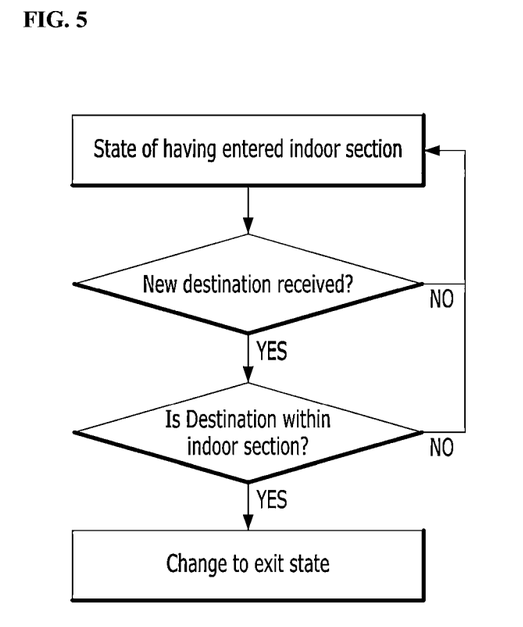
FIG. 5 is a flowchart showing a process of changing the state of a vehicle from an entry state to an exit state in response to a new destination setting in a driving information display apparatus according to various exemplary embodiments of the present disclosure.

FIG. 5 is a flowchart showing a process of changing the state of a vehicle from an entry state to an exit state in response to a new destination setting in a driving information display apparatus according to various exemplary embodiments of the present disclosure.

When a vehicle is in an entry state and receives new destination information, the processor 110 is configured to determine whether a new destination is within an indoor section that the vehicle has entered, and changes the state of the vehicle to an exit state when the new destination is outside the indoor section that the vehicle has entered. When the driver sets a new destination outside the indoor section where the vehicle is located, the driver intends to move the vehicle from the corresponding indoor section to another space. Accordingly, whether the driver sets a new destination may be checked, and then the state of the vehicle may be changed to an exit state by analyzing the setting of the new destination.

The processor 110 is configured to determine whether the new destination is within the indoor section by comparing the location information of the new destination with information related to the location and range of the indoor section that the vehicle has entered. When the new destination input by the driver is inside the indoor section, the entry state needs to be maintained, so that it is necessary to accurately distinguish whether the input destination is inside the indoor section or outside the indoor section. Accordingly, the processor 110 may clearly distinguish whether the vehicle is in an entry state or in an exit state by checking information related to the location and range of the indoor section and then checking whether the new destination is located within the present range.

The above method may be utilized only when the driver inputs a new destination to the vehicle.

Another method will be described with reference to FIG. 6.

Figure 6:
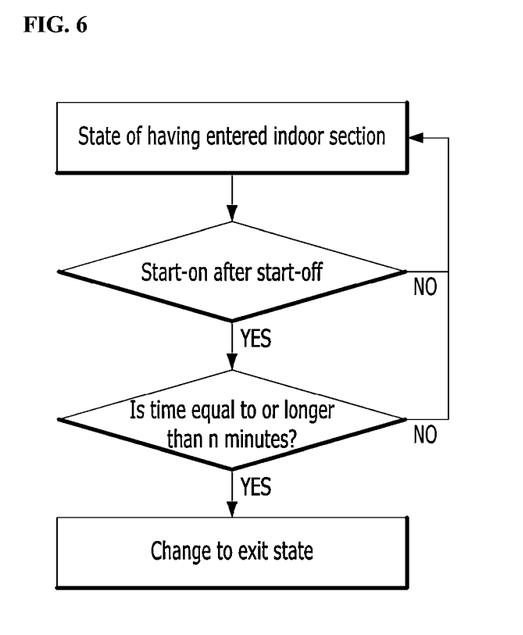
FIG. 6 is a flowchart showing a process of changing the state of a vehicle from an entry state to an exit state in response to a change in the starting state of a vehicle in a driving information display apparatus according to various exemplary embodiments of the present disclosure.

FIG. 6 is a flowchart showing a process of changing the state of a vehicle from an entry state to an exit state in response to a change in the starting state of a vehicle in a driving information display apparatus according to various exemplary embodiments of the present disclosure.

To determine whether the vehicle is in an entry or in an exit state, the processor 110 may be configured to receive information related to the starting state of the vehicle when the vehicle enters an indoor section and is in an entry state and to change the state of the vehicle to an exit state when the starting state of the vehicle is changed to an OFF state and then changed to an ON state after the entry to the indoor section.

In general, when a driver enters an indoor section via a vehicle, he or she portions the vehicle, and drives the vehicle again after work. Accordingly, when the starting state of the vehicle is changed to an OFF state after parking and then changed to an ON state after work, there is a strong possibility that the vehicle is in an exit state in which the vehicle wants to move from the indoor section to the outside thereof. Therefore, the state of the vehicle may be set to an exit state by checking whether the starting state of the vehicle is changed from an ON state to an OFF state and then changed to an OFF state again.

However, there is a problem in determining that all cases where the starting state of the vehicle is changed from an ON state to an OFF state and then changed to an OFF state again. It is desirable to maintain an entry state when the starting state of the vehicle is changed to an ON state because the starting state of the vehicle is accidently changed to an OFF state or when the starting state of the vehicle is changed to an OFF state for a while and then changed to an ON state for standby during parking.

Accordingly, the processor 110 may change the state of the vehicle to an exit state only when the difference between the time when the starting state of the vehicle is changed to the OFF state and the time when the starting state of the vehicle is changed to the ON state again is equal to or greater than a predetermined reference value. For example, assuming that the predetermined reference value is 5 minutes, it may be determined that the state of the vehicle has been changed to an exit state when the driver turns off the vehicle and then turns on the vehicle again after the elapse of 5 minutes.

Furthermore, other various methods may be applied thereto. For example, even in the case where the starting state of the vehicle is not changed to an OFF state, when it is determined by checking the location information of the vehicle that the vehicle is not moved at the same location for a predetermined reference time or longer and then starts to move again, the state of the vehicle may be changed to an exit state.

Furthermore, when an indoor section includes a plurality of floors and the vehicle moves in the direction of the floor where an exit is located, the state of the vehicle may be set to an exit state. For example, when there is an exit for vehicles on a first floor and the vehicle moves from a third basement floor to a second basement floor, it may be determined that the vehicle wants to move to the outside through the exit and thus the state of the vehicle may be set to an exit state.

In yet another method, the state of a vehicle may be set to an exit state when it is determined that the vehicle is parked and the vehicle is driven again after the parking. If the vehicle includes an automatic parking function, it may be determined that parking has been made when the automatic parking function of the vehicle is activated. If there is no automatic parking function, it may be determined that the vehicle has been parked when a predetermined time period has elapsed after the vehicle has changed to a reverse gear state and has stopped at a specific location. Because there are not many cases in which a reverse gear is used except for a parking situation, it may be determined with a high probability that parking has been made, and then it may be determined that the state of the vehicle has been changed to an exit state.

In yet another method, when the location information of the vehicle in an indoor section is accurately measured, it is checked whether the vehicle has stopped in a parking space, and the status of the vehicle may be changed to an exit state when the vehicle is driven again after the stopping in the parking space. When the map information of an indoor section includes information related to a parking space where a vehicle may be parked, it may be checked whether the vehicle has stopped at any one location of the corresponding parking space, and the state of the vehicle may also be changed to an exit state when the vehicle has been stopped in the parking space for a predetermined reference time or longer.

In yet another method, the state of the vehicle may be changed by checking whether the doors of the vehicle are opened and then closed in an indoor section and analyzing situations in which doors for the driver's seat and other seats are opened and closed. For example, when the operation of opening and closing the door for the driver's seat is repeated twice, it may be desirable to determine that the driver parks the vehicle, moves out of the vehicle, and then boards the vehicle again. Similarly, when it is determined using a weight sensor configured to check whether a driver is in a driver's seat that the driver vacates the seat and returns to the seat, it may be determined that the subsequent driving of the vehicle is driving in an exit state.

Using the various methods described above, the processor 110 may be configured to determine whether the vehicle is in an entry state or in an exit state. To more accurately determine the state of the vehicle, the various methods described above may be combined and perform analysis. Furthermore, it may also be possible to apply a technology that generates an artificial intelligence model through learning and more accurately analyzes the state of the vehicle based on the artificial intelligence model using various determination target information as input thereof values.

Figure 7:
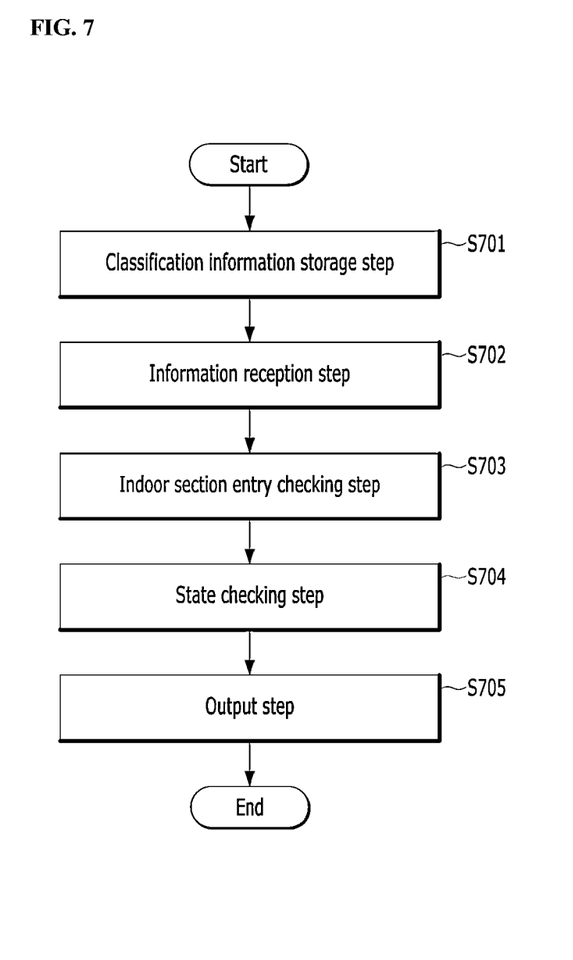
FIG. 7 is a flowchart showing the flow of a driving information display method according to various exemplary embodiments of the present disclosure.

FIG. 7 is a flowchart showing the flow of a driving information display method according to various exemplary embodiments of the present disclosure.

The driving information display method according to the exemplary embodiment of the present disclosure is a method which is performed in the driving information display apparatus 101 provided with the processor 110 and the storage unit 120, and the configurations described in conjunction with the operation of the driving information display apparatus 101 may be applied to the driving information display method without change. Accordingly, it may be possible for those skilled in the art to implement configurations not specifically described in connection with the driving information display method below by applying descriptions of the above-described driving information display apparatus 101.

In a classification information storage step S701, road information including classification information, in which display information to be provided in an indoor section is classified into entry guidance information, exit guidance information, and common guidance information, is stored in the storage unit 120.

In the classification information storage step S701, there is stored classification information, in which display information to be provided in an indoor section is classified into entry guidance information, exit guidance information, and common guidance information by analyzing the names of the display information.

In the classification information storage step S701, there is stored classification information which is generated by classifying display information as entry guidance information when the display information includes the name of a facility inside the indoor section or as exit guidance information when the display information includes the name of a road outside the indoor section.

In an information reception step S702, the processor 110 receives driving guidance information and information related to the location of a vehicle.

In an indoor section entry checking step S703, the processor 110 is configured to determine whether the vehicle has entered the indoor section based on the location information of the vehicle and the road information stored in the storage unit.

In a state checking step S704, when the vehicle has entered the indoor section, the processor 110 is configured to determine whether the vehicle is in an entry state or in an exit state based on the location information of the vehicle and the road information.

In the state checking step S704, when the vehicle has entered the indoor section from an outdoor section, the state of the vehicle is set to an entry state, whether a new destination is within the indoor section entered by the vehicle is checked when new destination information is received, and the state of the vehicle is changed to an exit state when the new destination is outside the indoor section entered by the vehicle.

In the state checking step S704, it is checked whether the new destination is within the indoor section by comparing the information related to the location of the new destination with information related to the location and range of the indoor section entered by the vehicle has entered.

In the state checking step S704, information related to the starting state of the vehicle is received, and the state of the vehicle is changed to an exit state when the starting state of the vehicle is changed to an OFF state after the enter to the indoor section and then changed to an ON state.

In the state checking step S704, the state of the vehicle is changed to an exit state only when the difference between the time when the starting state of the vehicle is changed to the OFF state and the time when the starting state of the vehicle is changed to the ON state again is equal to or greater than a predetermined reference value.

In an output step S705, the processor 110 perform control to output different guidance screens when the vehicle is in an entry state and when the vehicle is in an exit state, respectively.

In an output step S705, control is performed to output display information corresponding to entry guidance information and common guidance information when the vehicle is in an entry state and to output display information corresponding to exit guidance information and common guidance information when the vehicle is in an exit state.

The driving information display method according to an exemplary embodiment of the present disclosure may be implemented as a program to be executed by a computer and recorded on a computer-readable storage medium.

Examples of the computer-readable storage medium include magnetic media such as hard disks, floppy disks and magnetic tapes, optical storage media such as CDROMs and DVDs, magneto-optical media such as floptical disks, and hardware devices specially configured to store and execute program instructions, such as ROM, RAM, flash memory, and the like.

Examples of the program instructions include high-level language codes which may be executed by a computer using an interpreter or the like as well as machine language codes such as those produced by a compiler. Each of the hardware devices may be configured to act as one or more software modules to perform processing according to an exemplary embodiment of the present disclosure, and vice versa.

The present disclosure may achieve an effect of providing guidance information helpful for the driving of a vehicle in an indoor section.

The present disclosure may achieve an effect of preventing unnecessary information from being excessively provided by classifying and outputting display information according to the usage scenario of a vehicle.

The present disclosure may achieve an effect of accurately determining whether a vehicle is in a state of entering an indoor section or in a state of exiting the indoor section to output only necessary information according to the usage scenario of a vehicle.

Furthermore, there may be provided various effects which may be directly or indirectly understood by those skilled in the art through the present specification.

Although the present disclosure has been described with reference to the embodiments, those skilled in the art may variously modify and change the present disclosure without departing from the spirit and scope of the present disclosure described in the attached claims.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving information display apparatus comprising:
a processor configured to receive driving guidance information and information related to a location of a vehicle, and to perform control to output a guidance screen corresponding to the driving guidance information; and
a storage unit electrically and communicatively connected to the processor and configured to store road information and an algorithm executed by the processor;
wherein the processor is further configured to:
determine whether the vehicle has entered an indoor section based on the information related to the location of the vehicle and the road information;

in response that the vehicle has entered the indoor section, determine whether the vehicle is in an entry state or in an exit state based on the information related to the location of the vehicle and the road information;

perform control to output different guidance screens in response that the vehicle is in the entry state and in response that the vehicle is in the exit state, respectively;

receive information related to a starting state of the vehicle; and in response that the starting state of the vehicle is changed to an OFF state after an entry to the indoor section and then changed to an ON state again and a difference between a time when the starting state of the vehicle is changed to the OFF state and a time when the starting state of the vehicle is changed to the ON state again is equal to or greater than a predetermined reference value, change the state of the vehicle to the exit state.

2. The driving information display apparatus of claim 1, wherein the processor is further configured to:

set a state of the vehicle to the entry state in response that the vehicle enters the indoor section from an outdoor section;

in response that new destination information is received, check whether a new destination is within the indoor section that the vehicle has entered; and in response that the new destination is outside the indoor section that the vehicle has entered, change the state of the vehicle to the exit state.

3. The driving information display apparatus of claim 2, wherein the processor is further configured to check whether the new destination is within the indoor section by comparing information related to a location of the new destination with information related to a location and a range of the indoor section that the vehicle has entered.

4. The driving information display apparatus of claim 1, wherein the storage unit is further configured to further store classification information in which display information to be provided in the indoor section and selected from display information included in the road information is classified into entry guidance information, exit guidance information, and common guidance information, and wherein the processor is further configured to perform control to output display information corresponding to the entry guidance information and the common guidance information out of the display information in response that the vehicle is in the entry state and to output display information corresponding to the exit guidance information and the common guidance information out of the display information in response that the vehicle is in the exit state.

5. The driving information display apparatus of claim 4, wherein the storage unit is further configured to store the classification information obtained by classifying the display information, to be provided in the indoor section, into the entry guidance information, the exit guidance information, and the common guidance information through analysis of names of the display information.

6. The driving information display apparatus of claim 5, wherein the storage unit is further configured to store the classification information generated by classifying the display information as the entry guidance information in response that a name of the display information includes a name of a facility inside the indoor section and classifying the display information as the exit guidance information in response that the name of the display information includes a name of a road outside the indoor section.

7. A driving information display method which is performed in a driving information display apparatus provided with a processor and a storage unit electrically and communicatively connected to the processor, the driving information display method comprising:

an information reception step of receiving driving guidance information and information related to a location of a vehicle;

an indoor section entry checking step of checking whether the vehicle has entered an indoor section based on the information related to the location of the vehicle and road information stored in the storage unit;

a state checking step of, in response that the vehicle has entered the indoor section, determining whether the vehicle is in an entry state or in an exit state based on the information related to the location of the vehicle and the road information; and an output step of performing control to output different guidance screens in response that the vehicle is in the entry state and in response that the vehicle is in the exit state, respectively, wherein the state checking step further includes:

receiving information related to a starting state of the vehicle; and in response that the starting state of the vehicle is changed to an OFF state after an entry to the indoor section and then changed to an ON state again and a difference between a time when the starting state of the vehicle is changed to the OFF state and a time when the starting state of the vehicle is changed to the ON state again is equal to or greater than a predetermined reference value, change the state of the vehicle to the exit state.

8. The driving information display method of claim 7, wherein the state checking step includes:

setting a state of the vehicle to the entry state in response that the vehicle enters the indoor section from an outdoor section;

in response that new destination information is received, checking whether a new destination is within the indoor section that the vehicle has entered; and in response that the new destination is outside the indoor section that the vehicle has entered, changing the state of the vehicle to the exit state.

9. The driving information display method of claim 8, wherein the state checking step further includes checking whether the new destination is within the indoor section by comparing information related to a location of the new destination with information related to a location and a range of the indoor section that the vehicle has entered.

10. The driving information display method of claim 7, further including:

storing classification information in which display information to be provided in the indoor section and selected from display information included in the road information is classified into entry guidance information, exit guidance information, and common guidance information, wherein the output step includes performing control to output display information corresponding to the entry guidance information and the common guidance information out of the display information in response that the vehicle is in the entry state and to output display information corresponding to the exit guidance information and the common guidance information out of the display information in response that the vehicle is in the exit state.

11. The driving information display method of claim 10, wherein the storing of the classification information includes storing the classification information obtained by classifying the display information, to be provided in the indoor section, into the entry guidance information, the exit guidance information, and the common guidance information through analysis of names of the display information.

12. The driving information display method of claim 11, wherein the storing of the classification information includes storing the classification information generated by classifying the display information as the entry guidance information in response that a name of the display information includes a name of a facility inside the indoor section and classifying the display information as the exit guidance information in response that the name of the display information includes a name of a road outside the indoor section.

13. A computer-readable storage medium having stored thereon a program that causes a computer to perform the driving information display method of claim 7.

* * * * *